United States Patent
Koller et al.

(10) Patent No.: US 8,589,218 B2
(45) Date of Patent: Nov. 19, 2013

(54) APPRAISAL AND OBJECTIVES INTEGRATION

(75) Inventors: Walter Koller, Bad Schönborn (DE); Mathias Schoenecker, Forst (DE); Maurice Hagen, Heidelberg (DE)

(73) Assignee: SAP AG, Walldorf (DE)

( * ) Notice: Subject to any disclaimer, the term of this patent is extended or adjusted under 35 U.S.C. 154(b) by 2661 days.

(21) Appl. No.: 10/135,884

(22) Filed: Apr. 29, 2002

(65) Prior Publication Data

US 2003/0204440 A1    Oct. 30, 2003

(51) Int. Cl.
    G06Q 30/00 (2012.01)
(52) U.S. Cl.
    USPC .......................................................... 705/14.1
(58) Field of Classification Search
    USPC ........................................... 705/11, 14, 14.1
    See application file for complete search history.

(56) References Cited

U.S. PATENT DOCUMENTS

| | | | | |
|---|---|---|---|---|
| 5,926,794 | A * | 7/1999 | Fethe | 705/11 |
| 6,119,097 | A | 9/2000 | Ibarra | |
| 6,662,164 | B1 * | 12/2003 | Koppelman et al. | 705/14 |
| 2002/0035500 | A1 | 3/2002 | Yoko et al. | |
| 2002/0035506 | A1 * | 3/2002 | Loya | 705/14 |
| 2003/0004967 | A1 * | 1/2003 | Calderaro et al. | 707/104.1 |
| 2003/0204423 | A1 | 10/2003 | Koller et al. | |
| 2003/0204424 | A1 | 10/2003 | Koller et al. | |
| 2003/0229529 | A1 * | 12/2003 | Mui et al. | 705/8 |

OTHER PUBLICATIONS

Koller, Walker et al., "Management by Objectives," U.S. Appl. No. 10/135,890, filed Apr. 29, 2002.
Koller, Walker et al., "Appraisal Processing," U.S. Appl. No. 10/135,885, filed on Apr. 29, 2002.
Dinesh, David et al., "Management by Objective and the Balanced Scorecard: Will Rome Fall Again?", 1998, Management Decision, vol. 36. Issue 6, p. 363. [ProQuest].
Simpson, John A., "Management by Objective for Appraisal Firms," Jul. 1993, The Appraisal Journal, vol. 61, Issue 3, pp. 380-385. [ProQuest].
Muczyk, Jan P. et al., "MBO as a Complement to Effective Leadership," May 1989, The Academy of Management Executive, vol. 3, Issue 2, pp. 131-138. [ProQuest].
Odiome, George, "MBO Means Having a Goal and a Plan Not Just a Goal," Sep. 1992, Manage, vol. 44, Issue 1, pp. 8-11. [ProQuest].

* cited by examiner

*Primary Examiner* — Daniel Lastra
(74) *Attorney, Agent, or Firm* — Finnegan, Henderson, Farabow, Garrett & Dunner, LLP

(57) ABSTRACT

A software program assists in establishing goals and objectives and creating appraisals based on those goals and objectives. The goals for an organization are determined, and individual objectives based on the goals are defined. The software program assigns weights and compensation adjustment guidelines to the individual objectives, and obtains a plurality of appraisals based on the individual objectives. The scores from the appraisals are combined with the compensation adjustment guidelines, and a suggested compensation adjustment is automatically determined. Any of the individual objectives may also have a corresponding qualification component, and an individuals qualifications may be automatically revised based on the appraisal grades and the corresponding qualification component.

20 Claims, 5 Drawing Sheets

APPRAISAL AND OBJECTIVES INTEGRATION

TECHNICAL FIELD

This invention relates to personnel management software, and more particularly to objective setting and automatic compensation adjustment software.

BACKGROUND

Global competition not only forces enterprises to optimize their operating business processes, it also means that they have to react to new developments on a strategic level. Although most enterprises are far from being strategically optimized, this is exactly what will separate successful enterprises from less successful ones in the future.

This dynamic change in the enterprise environment means that human resource (HR) departments, too, face completely new tasks. It is no longer enough to support enterprise strategy with cost-optimized personnel management and to provide qualified employees. The future of personnel management lies in a consistent, strategic orientation. HR departments must ask themselves what part they can play in reaching enterprise goals and how they can increase the value of the enterprise.

By proactively participating in the implementation of enterprise strategy, an HR department can develop into an important link in the value chain and position itself as consultant and partner for management and employees.

Several factors are very important here: reliable cost planning, new recruitment processes, building up compensation models that are internationally recognized and comparable, and the introduction of up-to-the-minute systems for personnel management, communication, and analysis. But until now, there have been no integrated, e-business software solutions that handle these processes and also offer complex evaluation, analysis, and simulation options.

SUMMARY

A software program assists in establishing goals and objectives and creating appraisals based on those goals and objectives. The goals for an organization are determined, and individual objectives based on the goals are defined. The software program assigns weights and compensation adjustment guidelines to the individual objectives, and obtains a plurality of appraisals based on the individual objectives. The scores from the appraisals are combined with the compensation adjustment guidelines, and a suggested compensation adjustment is automatically determined. Any of the individual objectives may also have a corresponding qualification component, and an individuals qualifications may be automatically revised based on the appraisal grades and the corresponding qualification component.

DESCRIPTION OF DRAWINGS

These and other features and advantages of the invention will become more apparent upon reading the following detailed description and upon reference to the accompanying drawings.

DETAILED DESCRIPTION

Converting company goals into concrete, measurable employee objectives creates clearly defined expectations. The employees are then better able to meet their individual goals, and the performance of the employees is more easily measured. Management by Objectives creates and utilizes a concrete set of company goals. A Balanced Scorecard is often used in conjunction with Management by Objectives. Scorecards allow development of employee objectives that are based on your enterprise's goals and visions. The definition of a balanced scorecard is based on four perspectives that contribute to the success of an enterprise:

Financial
Customer
Process
Learning and development

At the enterprise level, strategic enterprise goals are set to be met for each of these perspectives. You can then break down these goals to area and department goals and store them in scorecards. For each strategic goal in a scorecard, concrete initiatives and key figures are defined. In other words, the objective, how it will be reached, and what measurement will be used to determine if it was reached is described. As a final step, departmental goals are broken down into objectives for individual employees.

Figure 1:
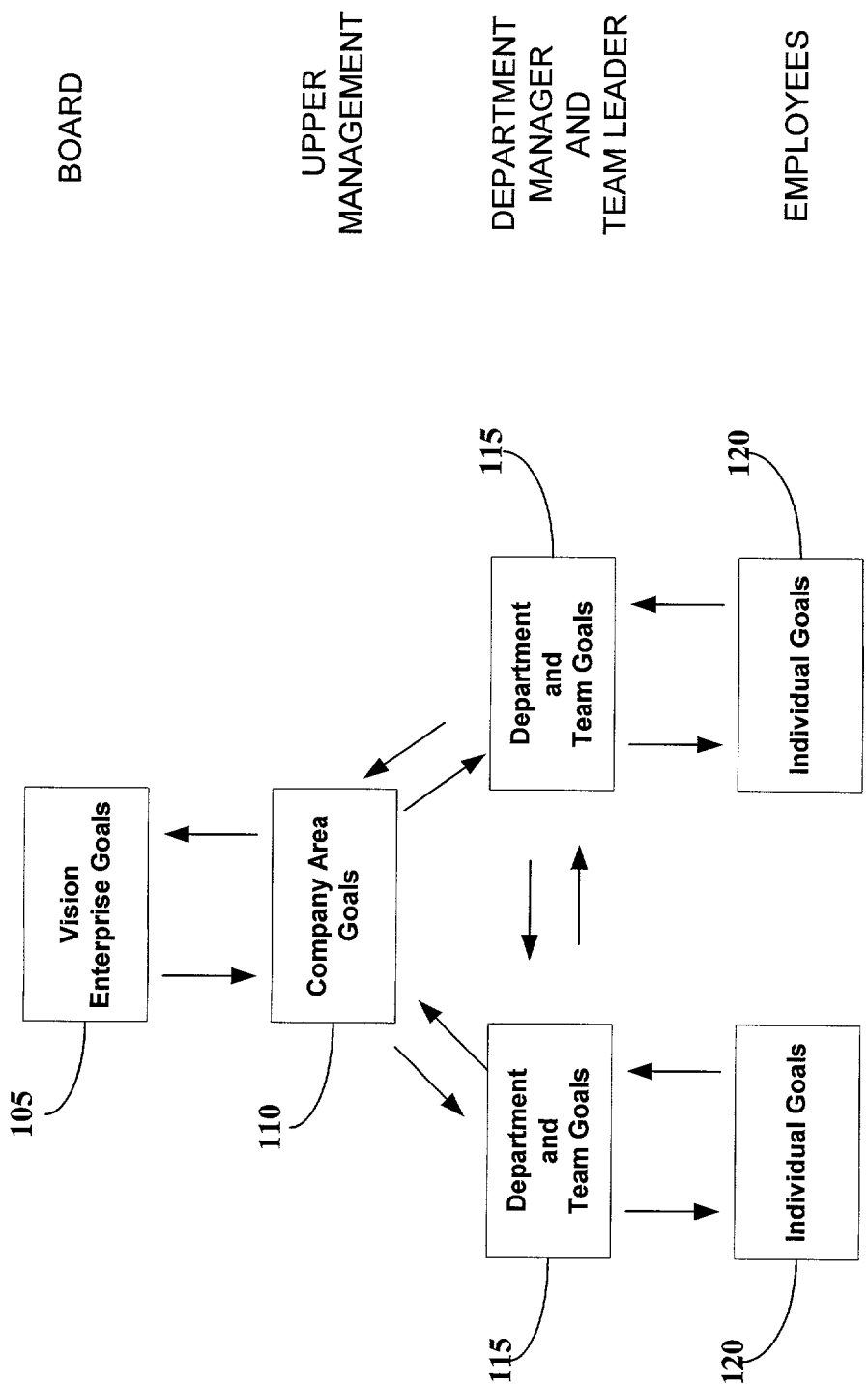
FIG. 1 illustrates the goal setting process of an organization using both a top-down and a bottom-up process.

Referring to FIG. 1, objectives are set during planning meetings that take place at every level of the enterprise. The objectives may begin at the board level, where vision enterprise goals 105 are determined. An upper management level may take the vision enterprise goals 105 and determine the company area goals 110 that are needed for each area of the company to achieve the vision enterprise goals 105. The company area goals 110 are forwarded to the department manager and team leader level, where department and team goals 115 are determined. From the department and team goals 115, individual goals 120 may be created at the employee level.

The vision enterprise goals 105 that the executive team has are communicated from the top down—from executives to managers to employees. During this process, the goals are differentiated and adjusted appropriately. Planning meetings provide a forum for soliciting employees' ideas and opinions and gaining employees' commitment to achieving objectives. As FIG. 1 illustrates, this transforms a top-down approach into a bottom-up process that includes all employees—one that can greatly increase employees' commitment to achieving objectives. The goals may be recorded in a software program such as SAP Strategic Enterprise Management (SEM).

Figure 2:
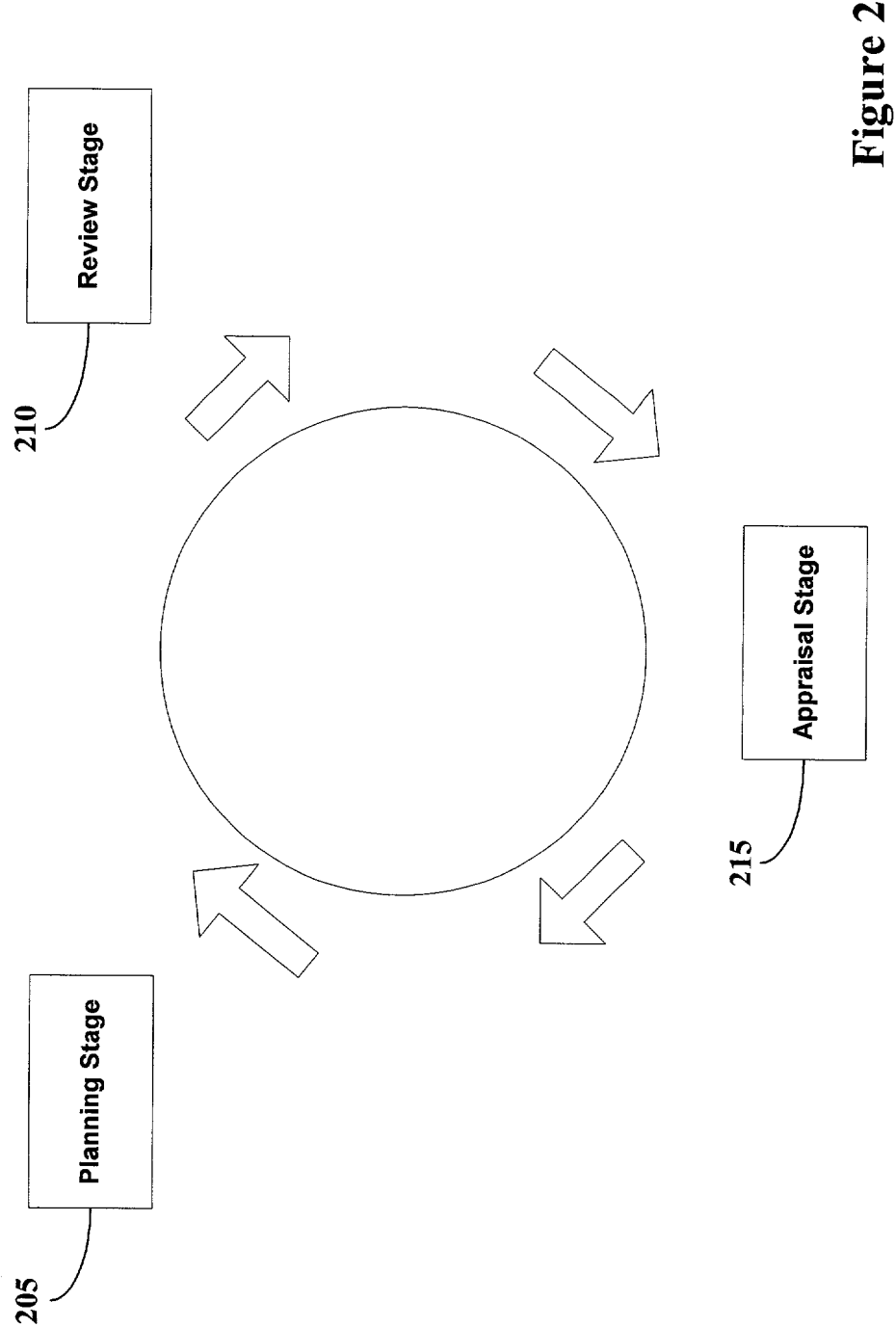
FIG. 2 illustrates a complete cycle of the management by objective process including planning, review, and appraisal.

As shown in FIG. 2, the management by objective process starts with a planning stage 205 including objective-setting interviews between employees and their superiors. During the interview, the superior and employee agree on concrete objectives (quantitative and qualitative) that are to be reached by an agreed-upon date.

Ideally, these concrete objectives support the vision enterprise goals 105 (which need to be communicated to employees in advance). In this way, employees can understand how they contribute to the success of the enterprise. If this method of personnel management is to be successful, both short-term objectives (those related to immediate performance) and long-term objectives (those related to personnel development and the mastery of competencies) should be defined, and employees should agree to complete them. Objectives should be realistic and achievable without being trivial. Linking the attainment of objectives to an employee's salary can increase the success of this method. The agreed upon objectives are recorded in the system and can be added to personnel files.

A review stage 210 provides feedback for the employee in the management by objectives process. The date for a review is set during the objective-setting interview. A formalized review takes place during the year and helps to ensure that employees do not lose sight of the objectives. At this review, the participants can compare the objectives with the results they have already achieved, determine if the objectives are still relevant, and modify them as necessary. If an additional review is required, the participants can set a new date.

In the appraisal stage 215, a final evaluation is conducted, based on the degree to which the employee has achieved objectives. If required, the immediate superior, several superiors, colleagues, employees, and even the individual being evaluated can perform the appraisal. Depending on the final appraisal, an employee's salary may be adjusted accordingly. At the same time, the planning stage 205 for the following period can be conducted, thus completing the cycle.

When a superior and employee have agreed upon the objectives, they can complete an objective-setting agreement (also known as an appraisal document) that records the objectives. The objective-setting agreement serves as the basis for reviews and for the final appraisal. The objective-setting agreement may be created using a template that may be accessed from a web interface or any other user interface. Because objectives are only usually set once a year, simple and intuitive Web interfaces have the advantage that they require little or no training, and acceptance is usually very high.

The department and team goal 115 and individual goals 120 may be automatically pulled from the departmental scorecard in a software program such as SAP SEM. These goals then appear as text in the objective-setting agreement. In addition, there can be a link to your department's Balanced Scorecard in SAP SEM so that employees can view departmental goals and their dependencies at any time.

The objective-setting agreement may define certain objectives, such as skills or knowledge that all employees in a department need to meet future challenges. For example, these objectives can be qualifications that are taken from a qualifications catalog. When the appraisal is complete, an employees' qualifications and proficiencies may be automatically inserted into their qualifications profiles.

Objectives may also be obtained from a requirements profile of the employee's position. Using Business Add-Ins (BAdI) technology, objectives may be further created automatically. For example, the requirements profile of a related job may be used to create objectives. Individual objectives may also be created so HR professionals and managers can take into account employees' special development objectives and their particular tasks.

The flexibility to create objectives means that those with personnel responsibility have numerous ways of differentiating between employees. This ensures that the performance requirements and the developmental potential of employees are taken into account properly, and it paves the way for employees to achieve their objectives effectively.

The present invention may take results from a performance overview assigned to the employee in a software program such as SAP SEM and include them in the final appraisal. In this way, the system establishes a direct connection to strategic objectives, initiatives, and individual measurement values that are stored in scorecards. Notes may be created in the objective-setting agreement, and the importance of each agreed-on objective may be weighed. This allows employees with personnel responsibility to ensure that the overall appraisal is balanced, i.e. important objectives have more weight than less important ones. After the employee's final appraisal, the present invention uses rules to determine the overall score based on all the appraisals from various sources (for example part and final appraisals).

The present invention includes at least three appraisal types; objective-setting, simple appraisal, and 360 degree feedback. The objective-setting appraisal with part and final appraisal is a type of appraisal specifically designed for Management by Objectives. It allows one to formulate objectives individually and to change or delete objectives during reviews. It allows appraisals by many different participants (for example the part appraisers whose evaluations can be used to determine the final appraisal). Each part appraiser's name appears on the document, and all the part appraisers edit the same appraisal document one after the other.

Appraisals of this type may be set up so that participants only see the parts of the appraisal document that are relevant to them. A manager may specify which parts of the document individual part appraisers can see and which appraisal elements they can evaluate. Restricted access options ensure that part appraisers cannot see other appraisals or confidential information (for example, a superior's appraisal). Privacy features ensure that appraisers can make their personal assessment without being influenced by others' opinions. Part appraisers may typically see, but not edit, appraisal elements that they are not authorized to evaluate.

Simple appraisals allow one appraisal for each appraisal criterion, along with a weighting of the individual appraisal criteria, if desired. This appraisal type is used for classic performance appraisals, which are not preceded by an objective-setting process. The appraisal elements can simply be taken from the job description. Examples of these appraisal elements could be the degree to which an employee has mastered a programming language or has demonstrated team spirit.

The present invention also allows collection of 360 degree feedback. The 360 degree appraisals can contain the same elements as simple appraisals or objective setting agreements. However, each part appraiser receives an appraisal document, which can be completed anonymously, if so desired. The submitted appraisals may then be evaluated using a wide range of criteria.

Figure 3:
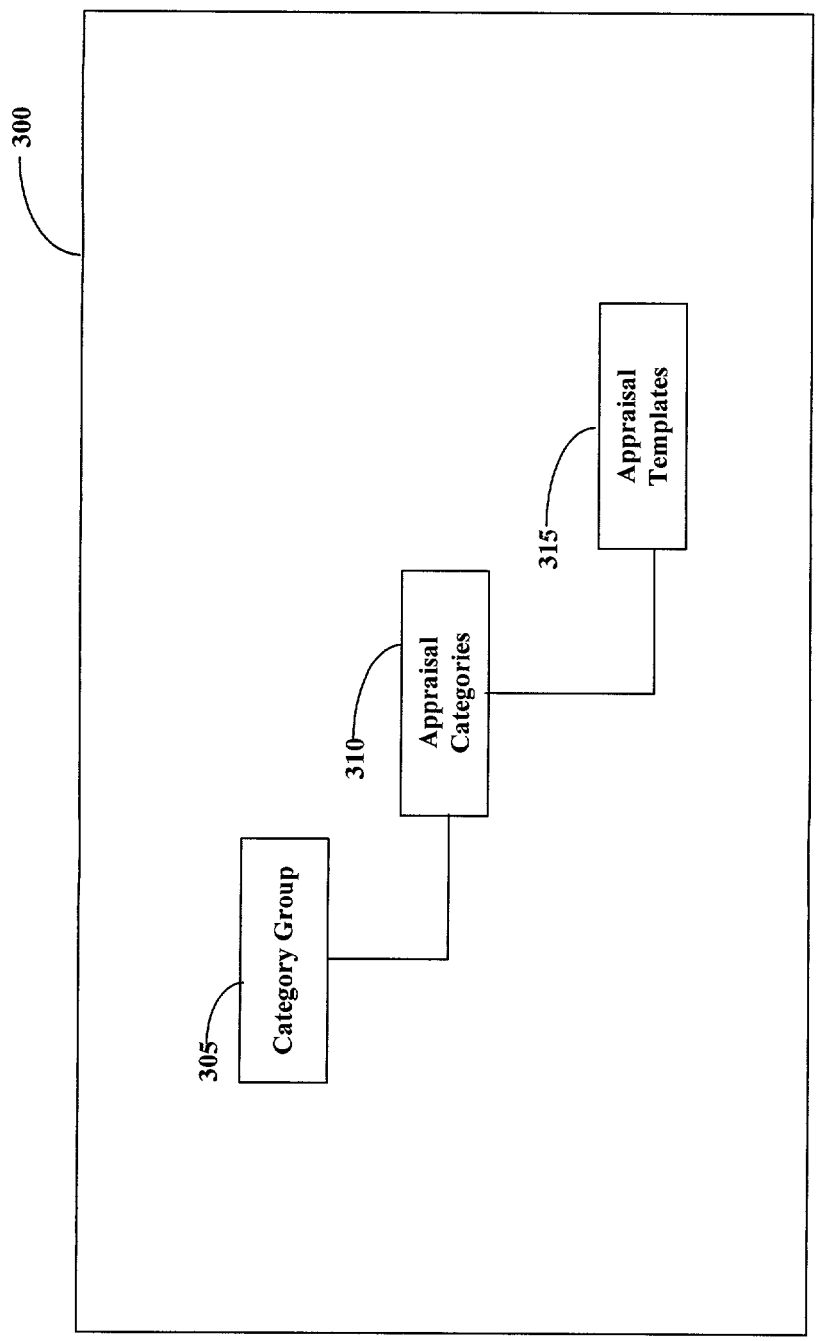
FIG. 3 illustrates an exemplary appraisal template catalog.

An appraisal template catalog 300 as shown in FIG. 3 allows for building up and managing an objective-setting and appraisal system. The elements that make up an objective-setting and appraisal system are clearly laid out in the appraisal template catalog in a convenient hierarchical structure. The top level of the hierarchy is the category group 305, which groups together the templates for particular areas. The level below this is made up of appraisal categories 310, which group together the objective-setting documents and appraisal templates. It is here that one specifies the appraisal type for the appraisal templates. Also at this level, a number of other standard values for the appraisal templates may be specified, including:

Which types of appraisers, appraisees, or other participants will be involved in the completion of the appraisal template.

The columns available for appraisal templates of this category (for example, the objectives, part appraisals, and final appraisal columns).

What roles the participants can have.

Which value lists can be used in the appraisal templates. For example, one can allow only "yes" or "no" answers for a particular category.

Which functions can be used for the appraisal templates in this category. Examples of this include calculation formulae (such as average or total), the origin of specific data (for example, the transfer of the score from a performance overview), the type of appraisal data processing (for example, the transfer of obtained qualifications or the transfer of data a compensation management program).

The next level of the hierarchy consists of the objective setting or appraisal templates 315, which form the basis of the individual objective-setting agreements. One can create as many of these templates as desired, providing every manager in the enterprise with the templates they need to run their departments according to the Management by Objectives philosophy.

The processing of the appraisals may be done to specify if data is taken from a performance overview, whether one or several appraisers are to participate, if the logging feature is active, and if downstream processes should take place after the appraisal is complete (for example, the adjustment of the employee's qualifications profile or the transfer of relevant data to a compensation management module).

Figure 4:
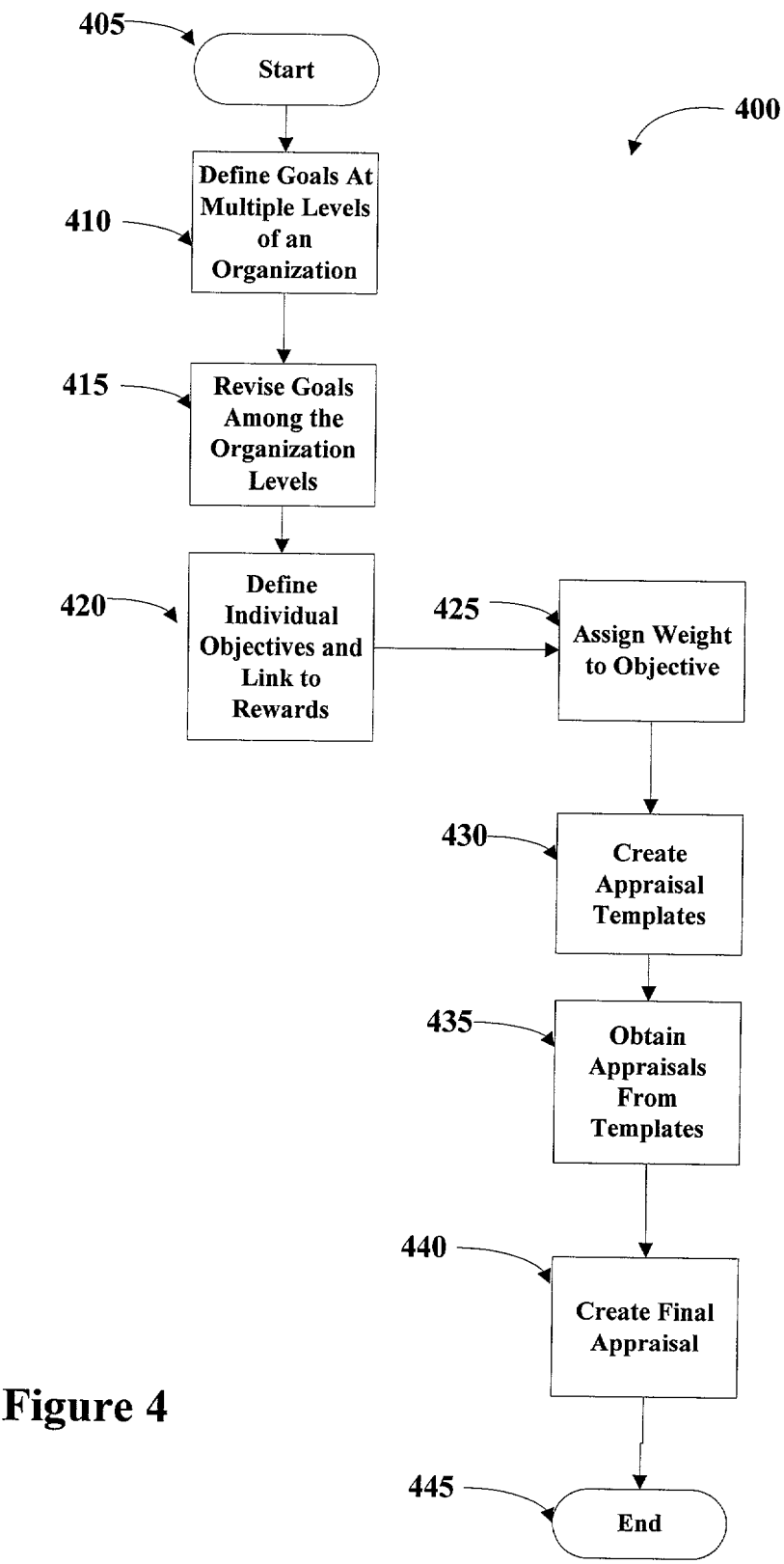
FIG. 4 illustrates a process for implementing the appraisal processing system.

A process 400 for appraisal processing is illustrated in FIG. 4. The process 400 begins at a START block 405. Proceeding to block 410, the process 400 defines the objectives or goals at multiple levels of an organization. As shown in FIG. 1, these goals may begin with the Board, and be defined at multiple levels including upper management, department manager, team leader, and individual employee. Of course, goals may be set at many different levels of an organization. The number of levels to set goals may vary among organizations depending on the organizations size and structure.

Proceeding to block 415, the process 400 then revises the goals among each of the different levels. The goals are adjusted based on the goals from the other levels. The goals may be communicated among levels and adjusted during planning meetings, where the goals are discussed and adjusted. This allows the setting and communicating of the goals to flow in both directions of the company, as illustrated in FIG. 1.

Proceeding to block 420, the process 400 defines objectives for individual employees or departments based on the goals established above. By creating individual objectives, the employees and departments have concrete, establish items to complete. The objectives may also be linked to rewards or incentives for achieving the objectives. For example, an employee's salary adjustment or bonus may be tied to achievement of an individual goal 120, or a department may be honored for achieving a department or team goal 115. By linking the goals to a set reward or incentives, people and departments may be more motivated to achieve the goals due to a concrete incentive. Also, linking objectives to individual employees or departments allows for a more definite determination of job success.

Proceeding to block 425, the process 400 assigns a weight to each objective for the individual employee. As any individual employee may have multiple objectives, it is important to provide a weight for each objective. For example, some objectives may be more complex and require much more work and effort to complete. These objectives should receive a higher weight, and thus count more toward the final appraisal score.

Proceeding to block 430, the process 400 creates appraisal templates to be used in collecting the appraisal information. The appraisal templates may be created using the appraisal template catalog. The templates may be provided to all the reviewers to make the appraisal process more standardized and efficient. The templates may be designed to use any appraisal type, including objective setting, simple appraisal, and 360 degree feedback.

Proceeding to block 435, the process 400 collects the appraisals from the distributed templates. The reviewers complete the templates to provide the data for the appraisals. Upon completion, the templates are automatically forwarded to a central database for collection and compilation.

Proceeding to block 440, the final appraisal is created based on each of the completed templates. The final appraisal combines all the reviews from each of the separate templates, and applies the weighting criteria to create the final appraisal. After the final appraisal is created, the process 400 terminates at END block 445.

The processing of the appraisals may be done to specify if data is taken from a performance overview, whether one or several appraisers are to participate, if the logging feature is active, and if downstream processes should take place after the appraisal is complete (for example, the adjustment of the employee's qualifications profile or the transfer of relevant data to a compensation management module).

In addition to supporting Management by Objectives, the present invention allows integration with other software modules. Examples of the other modules include SAP Strategic Enterprise Management (SEM) and the Compensation Management and Personnel Development capabilities of mySAP HR. Appraisees can jump from an objective setting agreement to the scorecard that is assigned to their departments. If no scorecard is assigned to the department, an appropriate scorecard in the hierarchy may be displayed. One can insert strategic goals from the departmental scorecard into the objective-setting agreement so that employees can read the strategic objectives in their objective-setting agreement and relate them to departmental, area, or enterprise strategies.

One can also create performance overviews for employees in SAP SEM. These overviews can contain any element from the scorecards. The descriptions and the result of the overview—the score—can be transferred to the objective-setting agreement. The score can then be included in the final appraisal.

A software program such as mySAP HR can automatically generate proposals for compensation adjustments by using the overall appraisal, any of the criteria groups, or any of the appraisal criteria of an employee. To accomplish this, the appraisal documents in question need to be combined with compensation guidelines. One can also automatically transfer newly obtained qualifications to an employee's qualifications profile after completing an appraisal.

The integration eliminates burdensome manual tasks that personnel development and compensation management professionals face, considerably reducing the amount of time spent maintaining the qualification profile and compensation guidelines.

One may call up objective-setting agreements in many different applications within a software program and in various Web environments, including:

The Manager's Desktop

Profile maintenance in mySAP HR Personnel Development

Web environment (for example, mySAP Enterprise Portals)

Figure 5:
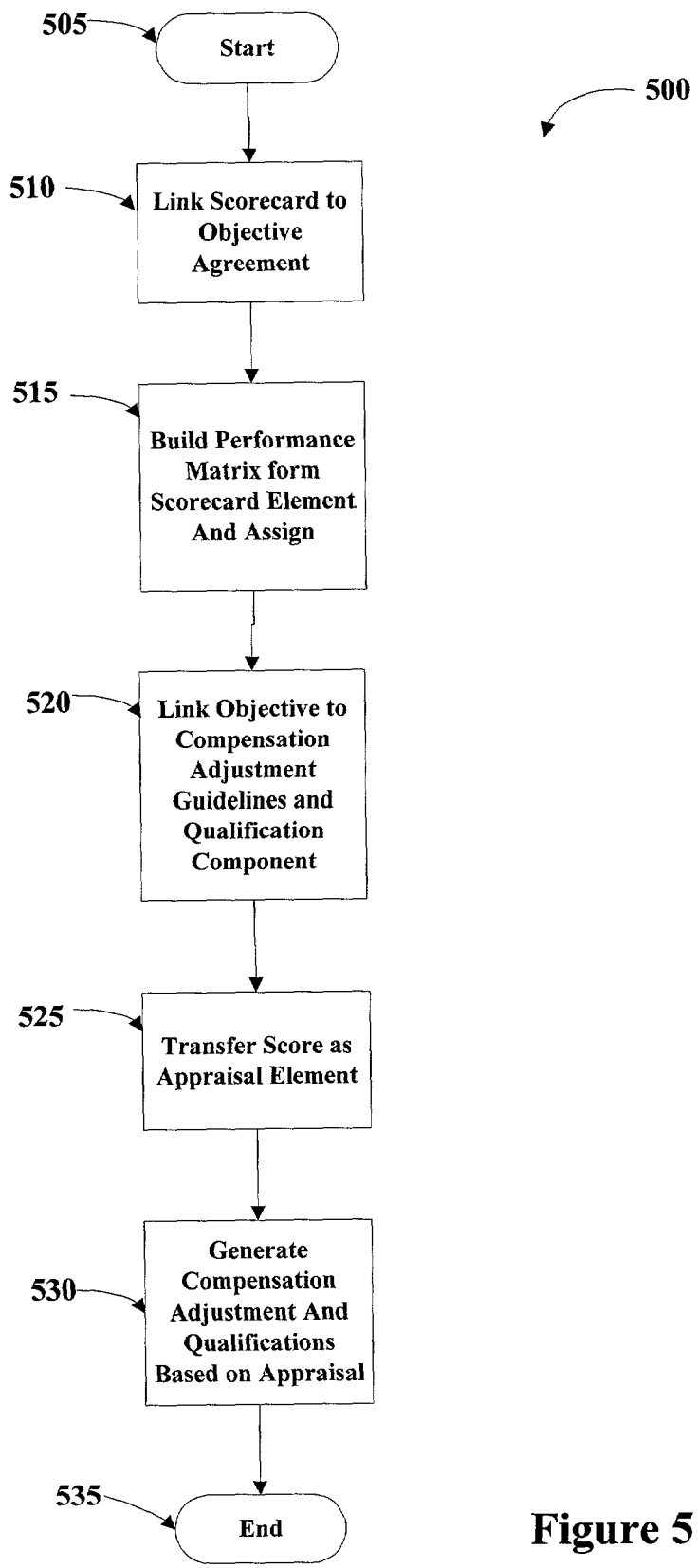
FIG. 5 illustrates a process for integrating the appraisal and objective processes to automatically update a qualification profile and compensation guideline

FIG. 5 illustrates a process 500 for integrating the appraisal and objective processes to automatically update a qualification profile and compensation guideline. The process 500 begins at a START block 505. Proceeding to block 510, the process 500 links the scorecard to the objective agreements. As stated above, strategic goal may be inserted from the scorecard into the objective setting agreement, allowing employees to view the actual individual and departmental objectives.

Proceeding to block 515, the process 500 builds a performance matrix based on the scorecard elements and assigns the performance matrix to an individual. The performance matrix may use a scorecard from an organizational unit and parse out the elements that apply to an individual.

Proceeding to block 520, the process 500 links each objective to a compensation adjustments guidelines. The objectives, and their respective weights, may be used to generate a compensation adjustment factor for the appraisal period. For example, an objective may have a compensation adjustment factor that generates a pre-determined raise if the objective is completed satisfactorily. The compensation adjustment guidelines may be tied to completion of the objective, quality at which the objective is completed, or may include a negative factor if the objective is not met. Each objective may have a separate compensation adjustment guideline, thus allowing multiple objectives to be factored into the final compensation determination. Additionally, each objective may also be tied to a qualification component if applicable. For example, if the objective includes becoming proficient in a software language, completion of the objective may be tied to the qualification component of competency in the software language.

Proceeding to block 525, the process 500 transfers a score as an appraisal element from the performance matrix to the appraisal documents. The score for each appraisal element is used to create the final appraisal document.

Proceeding to block 530, the process 500 generates a compensation adjustment and revises qualifications automatically based on the appraisal. The appraisal collects data from a variety of sources as described above. The compensation guidelines are combined and calculated to create a recommendation for compensation adjustment based on the appraisal and objectives achieved. The process 500 may be established to automatically implement the compensation adjustment, or may present the compensation adjustment as a recommendation to a supervisor for approval or modification. The qualification components should automatically be updated upon completion of the appraisal. The process 500 then terminates in END block 535.

Numerous variations and modifications of the invention will become readily apparent to those skilled in the art. Accordingly, the invention may be embodied in other specific forms without departing from its spirit or essential characteristics.

What is claimed is:

1. A computer-implemented method of appraisal performed by a machine comprising a storage medium, the method comprising:
   defining goals for an organization and storing the goals in the storage medium;
   defining objectives for an individual based on the goals for the organization and storing the objectives in the storage medium;
   creating an appraisal sheet for the individual from an appraisal template electronically populated with the objectives for the individual;
   storing compensation guidelines associated with the objectives, the compensation guidelines including a plurality of compensation adjustments, each compensation adjustment being associated with at least one of the objectives;
   storing qualification components associated with the objectives;
   collecting appraisal scores for the individual for the objectives based on performance of the individual;
   updating a qualification profile of the individual based on the qualification components and the appraisal scores;
   electronically generating a scorecard including the goals for the organization, the objectives for the individual, and the appraisal scores for the individual; and
   calculating, using the machine, a compensation adjustment recommendation for the individual according to the appraisal scores and the compensation guidelines, wherein calculating comprises computing the compensation adjustment recommendation as a total of the compensation adjustments weighted according to the appraisal scores for each of the objectives.

2. The method of appraisal of claim 1, wherein the appraisal scores are determined by appraisals from a plurality of individuals of the organization.

3. The method of appraisal of claim 1, wherein the appraisal scores are determined at a plurality of time periods.

4. The method of appraisal of claim 1, further comprising automatically adjusting a compensation of file individual based on the compensation adjustment recommendation.

5. The method of appraisal of claim 1, further comprising adjusting a compensation of the individual based on the compensation adjustment recommendation after the compensation adjustment recommendation has been reviewed and approved.

6. The method of appraisal of claim 1, further comprising generating a performance matrix including elements from the scorecard.

7. A machine-readable storage medium including instructions executed by a machine to perform a method of appraisal, the method comprising:
   defining goals for an organization;
   defining objectives for an individual based on the goals for the organization;
   creating an appraisal sheet for the individual from an appraisal template electronically populated with the objectives for the individual;
   storing compensation guidelines associated with the objectives, the compensation guidelines including a plurality of compensation adjustments, each compensation adjustment being associated with at least one of the objectives;
   storing qualification components associated with the objectives;
   collecting appraisal scores for the individual for the objectives based on performance of the individual;
   updating a qualification profile of the individual based on the qualification components and the appraisal scores;
   electronically generating a scorecard including the goals for the organization, the objectives for the individual, and appraisal scores for the individual; and
   calculating, using the machine, a compensation adjustment recommendation for the individual according to the appraisal scores and the compensation guidelines, wherein calculating comprises computing the compensation adjustment recommendation as a total of the compensation adjustments weighted according to the appraisal scores for each of the objectives.

8. The machine-readable storage medium of claim 7, wherein the appraisal scores are determined by appraisals from a plurality of individuals of the organization.

9. The machine-readable storage medium of claim 7, wherein the appraisal scores are determined at a plurality of time periods.

10. The machine-readable storage medium of claim 7, wherein the method further comprises automatically adjusting a compensation of the individual based on the compensation adjustment recommendation.

11. The machine-readable storage medium of claim 7, wherein the method further comprises adjusting a compensation of the individual based on the compensation adjustment recommendation after the compensation adjustment recommendation has been reviewed and approved.

12. The machine-readable storage medium of claim 7, wherein the method further comprises generating a performance matrix including elements from the scorecard.

13. An apparatus for appraisal comprising:
a storage medium storing instructions which, when executed by a machine, perform a method of appraisal the method comprising:
defining goals for an organization and storing the goals in the storage medium;
defining objectives for an individual based on the goals for the organization and storing the objectives in the storage medium;
creating an appraisal sheet for the individual from an appraisal template electronically populated with the objectives for the individual;
storing compensation guidelines associated with he objectives, the compensation guidelines including a plurality of compensation adjustments, each compensation adjustment being associated with at least one of the objectives;
storing qualification components associated with the objectives;
collecting appraisal scores for the individual for the objectives based on performance of the individual;
updating a qualification profile of the individual based on the qualification components and the appraisal scores;
electronically generating a scorecard including the goals for the organization, the objectives for the individual, and appraisal scores for the individual; and
calculating, using the machine, a compensation adjustment recommendation for the individual according to the appraisal scores and the compensation guidelines, wherein calculating comprises computing the compensation adjustment recommendation as a total of the compensation adjustments weighted according to the appraisal scores for each of the objectives.

14. The apparatus of claim 13, wherein the method further comprises determining the appraisal scores using appraisals from a plurality of individuals of the organization.

15. The apparatus of claim 13, wherein the appraisal scores are determined at a plurality of time periods.

16. The apparatus of claim 13, wherein the method further comprises automatically adjusting a compensation of the individual based on the compensation adjustment recommendation.

17. The apparatus of claim 13, wherein the method further comprises adjusting a compensation of the individual based on the compensation adjustment recommendation after the compensation adjustment recommendation has been reviewed and approved.

18. The apparatus of claim 13, wherein the method further comprises generating a performance matrix including elements from the scorecard.

19. A computer-implemented method of appraisal performed by a machine comprising a storage medium and a display, the method comprising:
defining organizational goals for an organization and storing the goals in the storage medium, the organizational goals being divided into multiple categories comprising financial, customer, process, and learning and development;
defining departmental goals for a department in the organization based on the organizational goals and storing the departmental goals in the storage medium;
defining individual objectives for an individual in the department based on the departmental goals, the organizational goals, and a requirements profile of a position of the individual, and storing the individual objectives in the storage medium, the individual objectives including short-term individual objectives and long-term individual objectives;
creating an appraisal sheet for the individual from an appraisal template electronically populated with the individual objectives;
assigning qualification components to the individual objectives;
assigning weights to the individual objectives;
storing, in the storage medium, compensation guidelines including a plurality of salary adjustments, each salary adjustment being associated with at least one of the individual objectives;
collecting individual appraisal scores for the individual objectives based on performance of the individual, the individual appraisal scores being determined by appraisals from a plurality of individuals in the organization;
updating a qualification profile of the individual based on the individual appraisal scores and the qualification components;
electronically generating an individual scorecard including the organizational goals, the departmental goals, the individual objectives, and the individual appraisal scores;
calculating, using the machine a compensation adjustment recommendation for the individual according to the individual appraisal scores and the compensation guidelines, wherein calculating comprises computing the compensation adjustment recommendation as a total of the salary adjustments weighted according to the individual appraisal scores for each of the individual objectives;
updating the compensation guidelines based on the individual appraisal scores;
electronically generating a departmental scorecard based on the individual scorecard, the departmental scorecard including the departmental goals and the organizational goals;
displaying, on the display, at least one of the individual scorecard, the departmental scorecard, the appraisal sheet, and the compensation adjustment recommendation;
changing or deleting the individual objectives after a review; and restricting access to at least one of the individual appraisal scores, the qualification profile, the individual scorecard, and the compensation adjustment recommendation.

20. The method of claim 19, wherein collecting individual appraisal scores is performed anonymously.

\* \* \* \* \*